Figure 1:
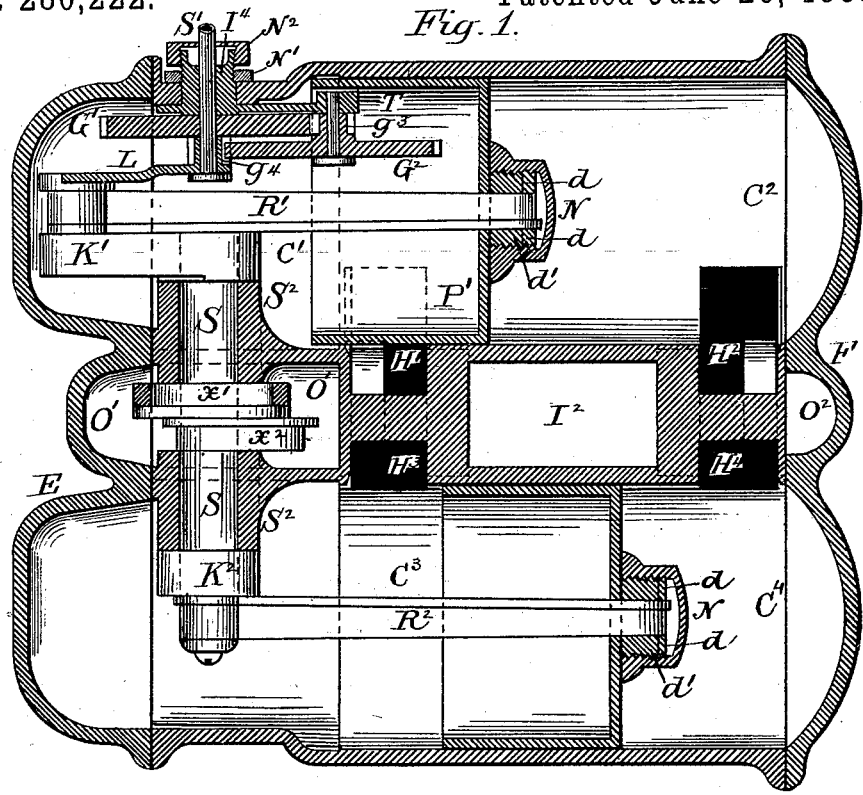

(No Model.) 3 Sheets—Sheet 1.

L. H. NASH.
WATER METER.

No. 280,222. Patented June 26, 1883.

Witnesses:
Edmund Brodhag
D. E. Grant

Inventor:
Lewis H. Nash
by Johnson & Johnson
Attys.

(No Model.) 3 Sheets—Sheet 2.

L. H. NASH.
WATER METER.

No. 280,222. Patented June 26, 1883.

Witnesses:
Edmund Brodhag
R. E. Grant

Inventor:
Lewis H. Nash
by Johnson and Johnson
Attys (No Model.) 3 Sheets—Sheet 3.

L. H. NASH.
WATER METER.

No. 280,222. Patented June 26, 1883.

Witnesses
Edmund Brodhag
R. E. Grant

Inventor:
Lewis Hallock Nash
by Johnson & Johnson
Atty.

UNITED STATES PATENT OFFICE.

LEWIS H. NASH, OF BROOKLYN, ASSIGNOR TO THE NATIONAL METER COMPANY, OF NEW YORK, N. Y.

WATER-METER.

SPECIFICATION forming part of Letters Patent No. 280,222, dated June 26, 1883.

Application filed January 30, 1883. (No model.)

*To all whom it may concern:*

Be it known that I, LEWIS HALLOCK NASH, a citizen of the United States, residing at Brooklyn, in the county of Kings and State of New York, have invented new and useful Improvements in Water-Meters, of which the following is a specification.

My improvements are directed to water-meters in which two measuring-pistons are coupled together, and each connected with an independent tubular slide-valve, the pistons being so arranged as to be coupled by a crank-shaft and the tubular valves actuated by eccentrics upon said shaft.

My said improvements are particularly directed to the production of such a piston-meter in which the tubular slide-valves are placed as close together as possible, and combined with connecting-rods passing entirely through them for the purpose of avoiding the angular strain and friction due to a short connecting-rod. Novel means are also provided for giving the greatest possible length to the piston-connecting rods for the same purpose. The shell of the meter is cast in one piece, and the bearings for the crank-shaft are formed in one end by drilling through the shell and in the same line through the interior solid parts cast with the shell, and thereby avoid joints in the shell, which require to be packed. The water is discharged from the space in which the cranks are arranged, at one end of the shell. Each tubular valve is operated by an eccentric, and the area of the space opened by the valve at any point in its stroke is proportional to the speed of the connected piston at that instant, so that the flow of water behind each piston will be just the amount required to drive it at its required speed in the stroke, and thus prevent undue strain upon the bearings, which would be produced by one piston tending to move faster than the other will allow. My object is to render the piston-meter compact, durable, and free from tendency to bind or stick in the working of the connected pistons and valves, and to lessen the number of packed joints in the shell.

The registering-gearing is driven by an arm which engages with the wrist-pin of one of the cranks of the crank-shaft, and by suitable intermediate gear arranged within the shell drives the spindle by which the connection with the dial-indicators is made.

Measuring-pistons coupled by cranks and connected with co-operating tubular sliding valves placed between the piston-cylinders have been combined in a water-meter; but in such construction it is of the last importance for accuracy in measurement that the connections of the controlling and measuring parts should give absolute freedom from strain and tendency to stick and bind. It is for this purpose that I have devised a construction and arrangement that will allow of the use of long connecting-rods for the pistons and for the valves—that is, passing the rods through the piston-heads and connecting them to the rear ends of the heads by covered joints, and passing the valve-connecting rods through said valves, and making such connection with both at points as near as possible in line with each other and in line with the crank-shaft.

To more particularly describe my invention, I will refer to the accompanying drawings, of which there are three sheets, illustrating my improved piston water-meter, and specifically point out the parts and combinations I claim as new.

Figure 2:
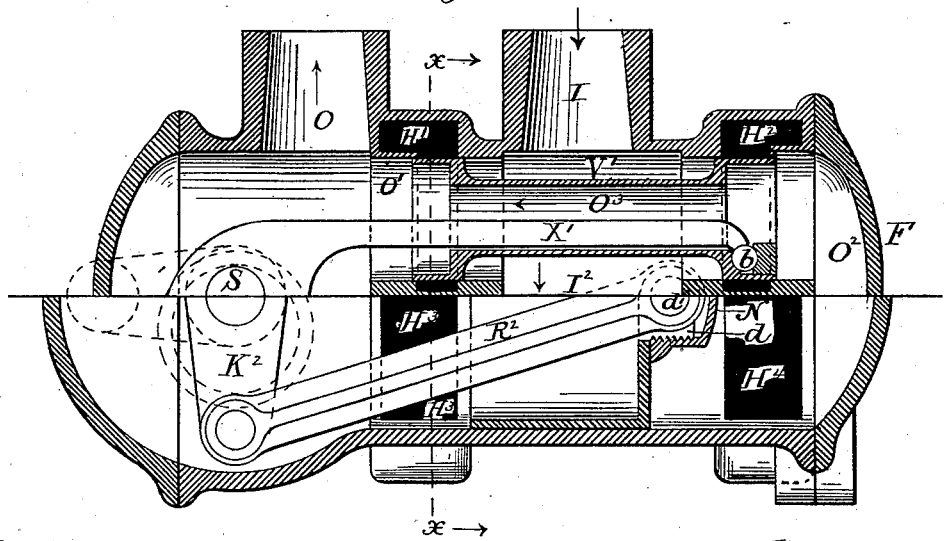
Figure 6:
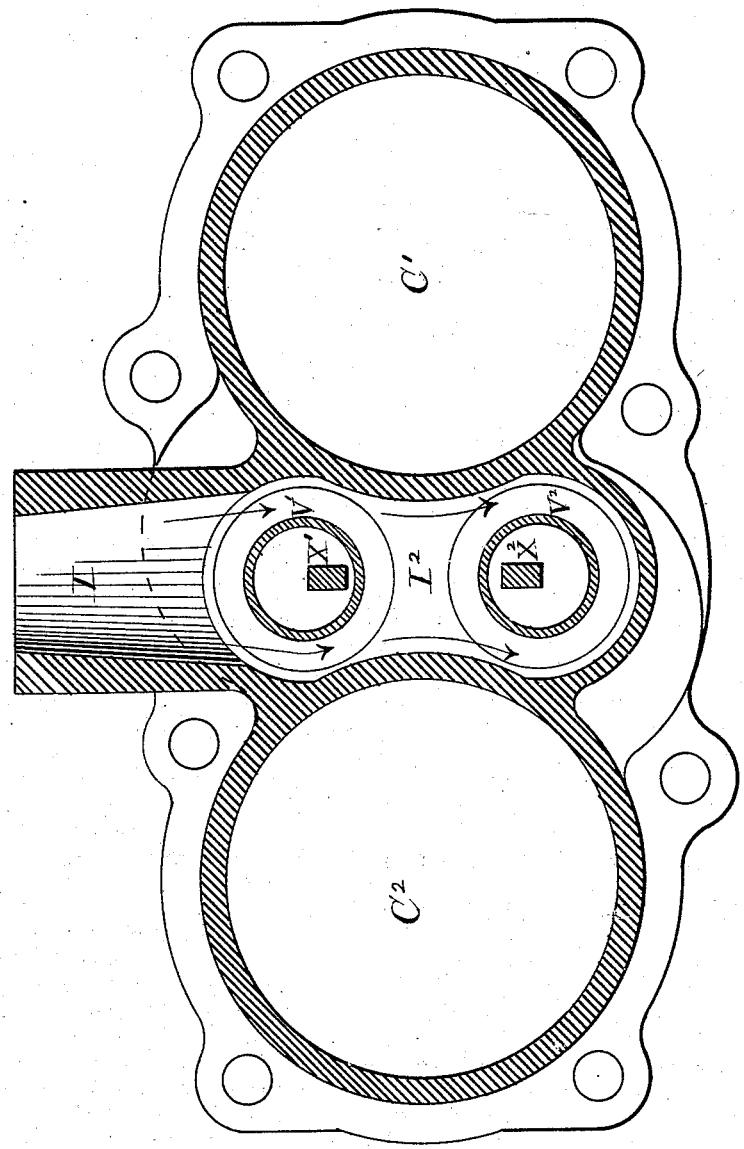

Figure 1, Sheet 1, represents in vertical central longitudinal section one of my meters, showing the pistons, their coupling crank-shaft, and the mechanism for operating the dial-indicator. Fig. 2, Sheet 1, represents the meter in horizontal longitudinal section, particularly showing the long connecting-rods for the pistons and for the tubular valves and the points of connection of said valve-rods nearly in line with the crank-shaft, to obtain the advantages stated. The section line of this view is taken through the dotted line A B C D of Fig. 3, which latter represents a cross-section of the meter on the line $x$ $x$ of Fig. 2, particularly showing the close disposition of the tubular valves between the piston-cylinders. Fig. 4 represents a horizontal longitudinal section of the meter, particularly showing the tubular slide-valves, the long rods connecting them with the eccentrics of the crank-shaft, and the relation of such rods to the valves and to the shaft, whereby to produce easy movements of the valves. Fig. 5 shows details of the connection of the pitman-rod with the valve-head;

and Fig. 6, a vertical cross-section taken through the inlet-opening, showing its communication with the inlet-chamber I$^2$, which extends across the meter-case.

The shell of the meter is cast in one piece, and it is divided centrally by an interior longitudinal obliquely-curved partition, so as to form a piston-cylinder on each side, open at each end, and communicating by suitable ports with a central chamber, I$^2$, which opens into the inlet-passage I, as shown in Figs. 2 and 4. Between the piston-cylinders, on each side of the curved partition, are formed valve-cylinders as close together as possible, within which tubular valves V' and V$^2$ are fitted to operate side by side, one for each piston. These tubular valves are formed with piston-heads, and are recessed between the heads, as shown, and are open at each end, and both communicate with the central chamber, I$^2$, which is arranged between the piston-heads of the valves. These valves also communicate at one end with a chamber, O', formed at the end of the shell within the shell-head E, and the division of the shell, said chamber communicating with the outlet O, while there is free communication directly through the tubular spaces O$^3$ of the valves with the other end of the shell by the chamber O$^2$, formed in the shell-head F, whereby the valves have communication with each other at each end. The cylinder-heads of the valves operate in connection with ports H' H$^2$ H$^3$ H$^4$, formed in the shell and opening into the valve-cylinders, as shown in Figs. 2 and 4, and in the position of valve V' therein shown the live water is ready to be admitted by said valve to the ports H' H$^2$, or by the valve V$^2$ to ports H$^3$ H$^4$, whenever communication is opened therewith. In this position of the valve V' both ports H' H$^2$ are closed and the crank K' shown in position as at the beginning of its stroke.

The pistons are hollow cylinders closed at one end, their open ends being next to the space within which the crank-shaft is arranged. They are connected with the cranks K' K$^2$ of the shaft S by connecting-rods R' R$^2$, said cranks being secured to the shaft at an angle, preferably ninety degrees to each other, so that one is always making its stroke while the other is passing its dead-center. The pistons are operated each by its own valve, and the valves are each operated by a connecting-rod, X' X$^2$, and an eccentric, $x'$ $x^2$, on the crank-shaft. The crank-shaft is arranged in bearings in the solid walls, which form the chamber O', as shown in Fig. 1. To secure the longest connecting-rods for the valves, I carry them through the tubular space O$^3$ of the valves, and connect each rod to the rear end of each valve by a bearing-pin or trunnion, $b$, for the purpose of avoiding the angular side strain and friction which would result from a short connecting-rod. The shaft is at one end of the shell in a line centrally crossing the piston-cylinders, which stand one above the other, and the tubular valves are arranged between them, one on each side, as close together as can be, whereby the valve-connecting rods are brought as near together as possible. The advantage of this construction for effecting the free and easy movements of the valves is still further increased by placing the bearing-pin or trunnion $b$ in the head of the valve, and close to the inner wall of said enlarged head, and thus bring the valve-rod connecting-pins $b$ very near on a line with the the crank-shaft, and carrying the rods through the valves to one side of their centers. The longer the piston-rod the easier will the piston work, and for this purpose provision is made by which the connecting-rod is passed through an opening in the closed head of the piston, and thereby connect the rod to the outer side instead of to the inner side of the hollow piston-head. This is effected by a cylindrical bearing-lug, $d$, cast upon the back of the piston-head, to which the connecting-rod is attached by a pin, $d'$, while a cup-nut, N, having an interior screw-thread, is screwed upon the lug $d$, which is threaded to receive said nut to cover the joint and prevent leakage. The eccentrics are secured upon the middle of the shaft by a pin or screw in a convenient manner, and can be easily connected to the valve-rods, while the cranks are arranged outside of the chamber O', and can be easily connected to their rods, the clearance-way in this end of the case giving ample room for this purpose.

I have stated that the bearings for the crank-shaft are drilled in the solid walls of the chamber O', and to do this I first drill a hole in the shell at its top, and then in vertical line with it I drill the bearings through the walls of the chamber O', which at this point are cast with the projections S$^2$ S$^2$ to give long bearings, so as to give a steady motion to the shaft. The eccentrics are placed joining the inner ends of these bearings, and the cranks joining their outer ends. The drilling of the bearings in this way saves forming the shell in two sections and the packing and joint fastenings which would be required by such sections.

The frame T, for holding the registering-gearing, is secured within the shell in the drilled opening by a screw-threaded plug, I$^4$, and a nut, N', screwed on its outer end.

The spindle S', which carries the dial-indicators, (not shown,) passes through the screw-plug I$^4$, and is packed outside of the nut N' by a screw-packing cover, N$^2$.

The registering-gearing may be of any suitable arrangement. That shown is simple and effective, and consists of an arm, L, loosely engaged with the crank-wrist K', and driven by it. This arm is fixed upon the lower end of the spindle S', to which a pinion, $g^4$, is fixed, and matches with a gear, G$^2$, carried by the frame T, while a pinion, $g^3$, fixed to said gear G$^2$, matches with a gear, G', fixed upon the spindle between the pinion $g^4$ and the frame T.

The outflowing water is discharged from each end of each tubular valve alternately;

that from the right end flowing out at O³, thence passing forward into the chamber O', and escapes through the outlet O. The valves are perfectly balanced; and although I prefer the form shown, yet I may use slide-valves to perform the same office.

The inlet and outlet currents may be reversed and the meter will operate the same, the recesses in the valves between their heads forming a water-way, communicating with the central passage, I², and the passage I.

The pin b of the valve-connecting rod is secured by a strap or box-plate, b', screwed to the valve-head, as shown in Fig. 5.

In Fig. 4 the current is indicated by the arrows, the valve V' being closed and valve V² shown as opening the port H³ to the inlet-water entering from I I² while outlet from port H⁴ is, as shown, in two directions, flowing through O³ in each valve to the common chamber, O', from whence it escapes through O. The inlet may be at any part of I².

In the operation of the meter each piston is controlled in its operation under the action of the fluid by its own valve, which is operated by its eccentric and rod from the crank-shaft. The eccentrics are set so that the valve opens the inlet-port on one side of its controlling-piston and the discharge-port upon the other side of its piston at the instant when the piston begins its new stroke, and the valve, remaining open until the stroke is completed, then instantly closes these ports, and at the same time opening the corresponding ports for the return-stroke of the piston. The inflowing water to the meter-case is admitted through the inlet-pipe I to an inlet-chamber, I², which extends across the meter-case, as shown in Fig. 6, and across this space that portion of the valves V' V² which is of smaller diameter than their heads extends to the valve-chambers on each side of said inlet-chamber, and the enlarged valve ends or heads, as they move in these valve-chambers, open communication between the cylinder-ports H' H² H³ H⁴, (see Fig. 4,) as the valves are operated by the eccentrics. The outflowing water is discharged in the operation of the valves alternately from each end of both valves. The water discharged from the ends of the valves communicating with O' issues directly into the chamber O', from whence its passes out through the outlet-pipe O. The water discharged by the valves from their ends communicating with the chamber O² passes from said chamber through the central valve-space, O³, as shown by the arrows, so that it also enters the chamber O', and is discharged through the pipe O.

Figure 3:
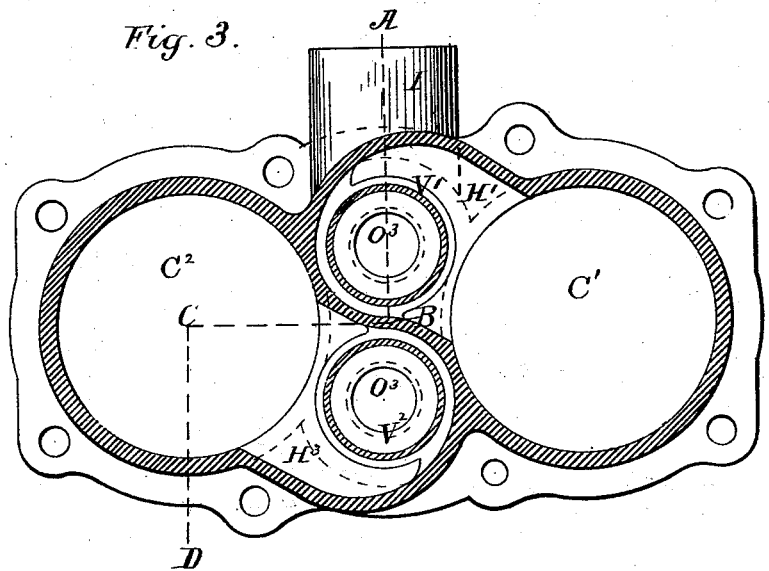
Figure 4:
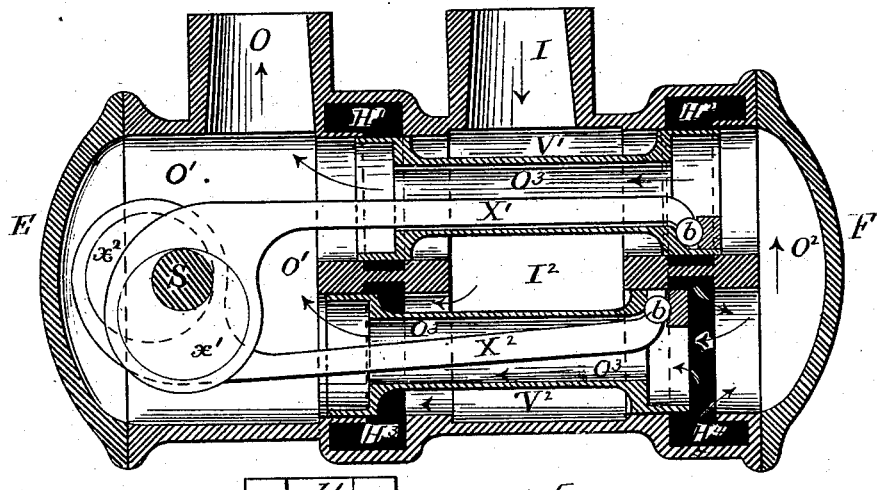
Figure 5:
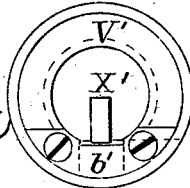

The passages H' and H² lead from the chamber of the valve V' at each end of the cylinder C', as shown in Figs. 1, 3, and 4, while similar passages, H³ and H⁴, lead from the chamber of the valve V² at each end of the cylinder C².

In the operation of the meter, Fig. 4 shows valve V² as opening the passage H³, so that the water can enter from chamber I², and from thence is admitted to the cylinder end C³, Fig. 1, forcing the piston into the cylinder-space C⁴, from whence the water escapes through the passage H⁴ at the end of the valve V² into the chamber O², and from this chamber it finds its outlet through the hollow valves to chamber O' and pipe O. As shown in Fig. 1, the piston P' is at one end of its stroke, and the valve V' is at the same time being carried toward its shaft, and at the instant when the crank K' has passed its dead-center the valve V' will have opened passage H', so that water from I² will enter the passage H', communicating with the cylinder-space C', Fig. 1, driving the piston P' back into space C², and passage H² being opened at the same time, the water from the cylinder-space C² will escape through passage H² into the chamber O², and thence through O³ to O' and out at pipe O.

I claim—

1. The combination, in a double-piston water-meter, of the hollow pistons and their operating crank-shaft with the tubular slide-valves and their operating connecting-rods x' x², extending through said valves, and connected at their ends farthest from the crank-shaft, as described.

2. In a double-piston water-meter, the combination, with the hollow measuring-pistons, the tubular slide-valves, and the crank-shaft, of the connecting-rods R' R², pivoted to the outer sides of the closed ends of the pistons, and having the pivot-joint connection covered and packed, substantially as described, for the purpose specified.

3. In combination, in a water-meter, the inclosing cast-metal shell, the hollow pistons, the tubular slide-valves, the crank-shaft, the piston-connecting rods, passing through the piston-heads and pivoted within an outside sealing-cap secured to said head, and the valve-connecting rods, passing through said valves and pivoted to one side of their centers, all arranged and constructed for operation substantially as described, for the purpose specified.

4. The combination, in a double piston-meter, of the hollow pistons, the tubular slide-valves, the crank-shaft, and the pitman-rods connecting said pistons and valves, with the registering device, consisting of the fixed frame T I⁴, the spindle S', the train of gear g⁴ G² g³ G', and the arm L on the pinion g⁴, having a free bearing against the pin of one of the cranks of said shaft, as described.

In testimony whereof I have hereunto set my hand in the presence of two subscribing witnesses.

LEWIS HALLOCK NASH.

Witnesses:
CHRISTOPHER C. WHITTEMORE,
WILLIAM C. WESTERVELT.